Oct. 12, 1926.
C. L. ROWLAND
1,602,506
CONTAINER
Filed Feb. 1, 1922   2 Sheets-Sheet 1
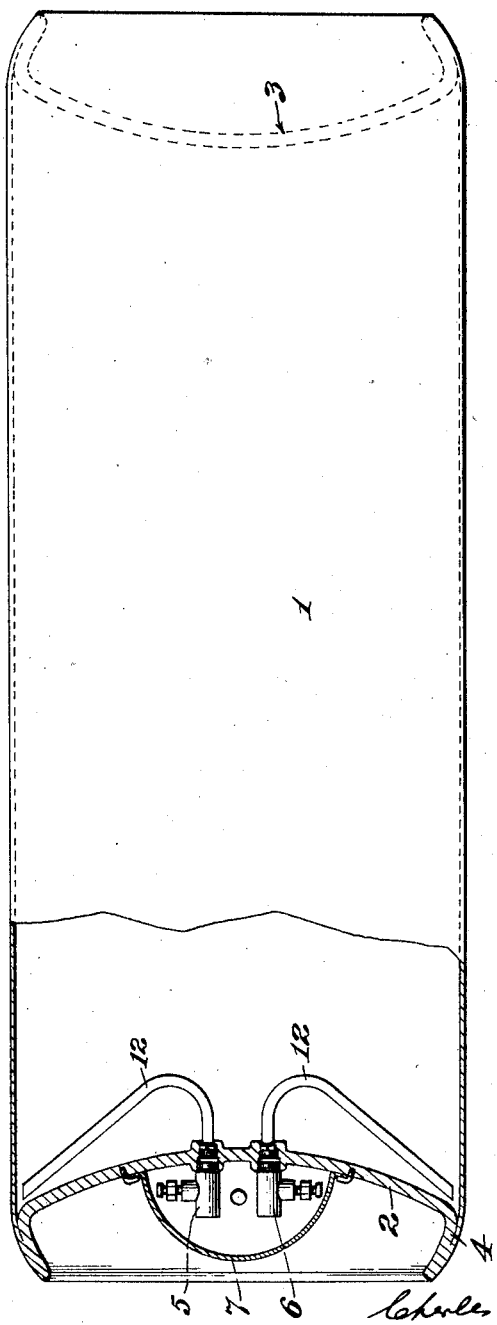
INVENTOR
Charles L. Rowland
BY
ATTORNEY Oct. 12, 1926.
C. L. ROWLAND
1,602,506
CONTAINER
Filed Feb. 1, 1922     2 Sheets-Sheet 2
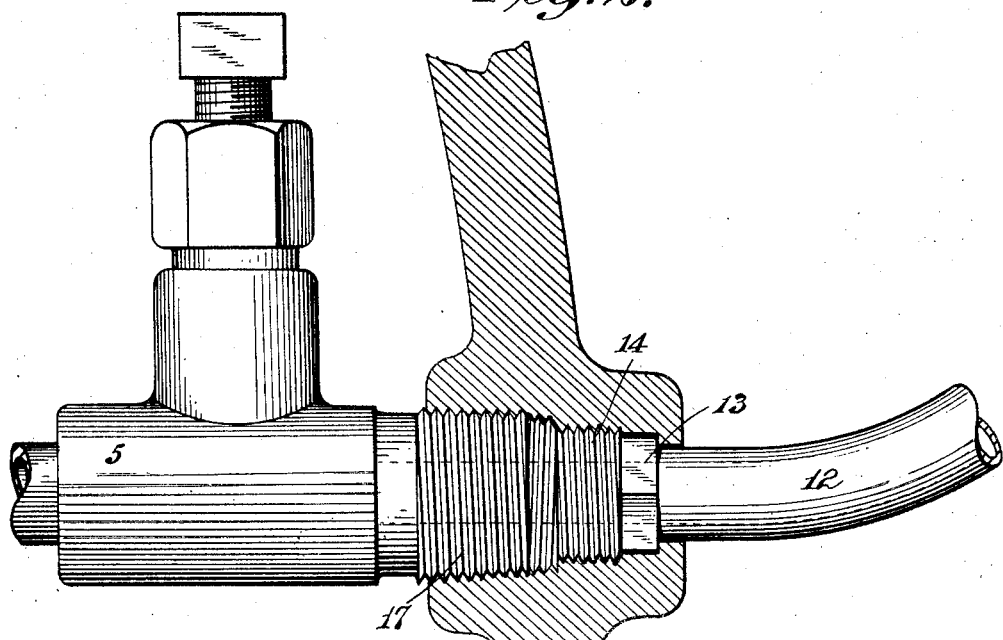
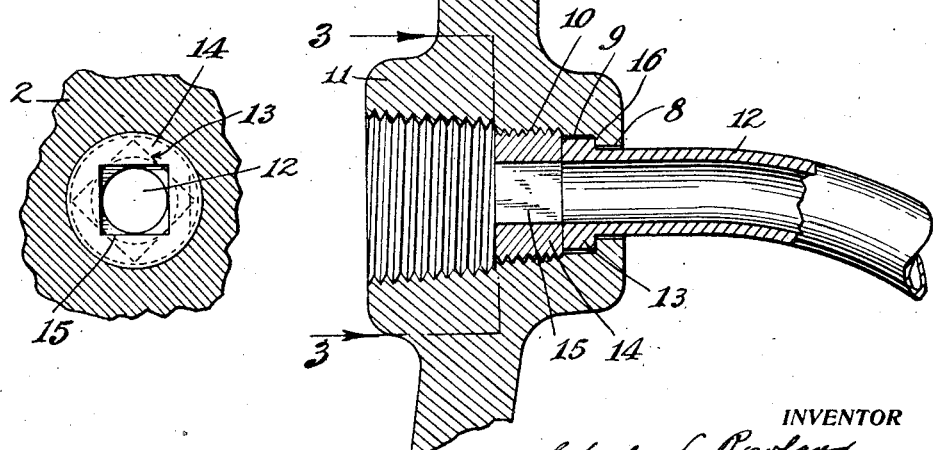
INVENTOR
Charles L. Rowland
BY
ATTORNEY Patented Oct. 12, 1926.

1,602,506

UNITED STATES PATENT OFFICE.

CHARLES L. ROWLAND, OF CARBONDALE, PENNSYLVANIA, ASSIGNOR, BY MESNE ASSIGNMENTS, TO SHIPPERS CAR LINE CORPORATION.

CONTAINER.

Application filed February 1, 1922. Serial No. 533,241.

This invention relates to containers for shipping fluids of a dangerous or deleterious character such as chlorine.

In Patent No. 1,216,733 a container of the general type here contemplated is disclosed. In that patent the body portion of the container is produced by lap welding the longitudinal seam and the heads are welded to the ends of the cylinder. Since, however, one of the heads carries a plurality of bent pipes connected with the valves it is necessary to attach the pipes to one head either before welding that head to the cylinder or before welding the other head to the cylinder. Owing to the character of the contents of the container the valves and valve seats and sometimes the pipes are in time destroyed and it is therefore desirable to renew these valves, valve seats and pipes from time to time. With the construction shown in Patent No. 1,216,733 it is not possible to replace the pipes. In the practice that existed prior to this patent it was customary to mount the pipes on removable man-hole-covers and to bolt such covers to the tank using gaskets to obtain a tight joint. While this construction admitted of the renewal of the pipes it furnished a place of leakage and was therefore abandoned in favor of the practice disclosed in the patent.

It is the main object and feature of this invention to combine the advantages of the replacement of the old practice with the non-leakage feature of the construction of the Patent No. 1,216,733.

In the accompanying drawings the invention is disclosed in a concrete and preferred form in which—

Fig. 1 is a general view of a container, partly in section, embodying the invention.

Fig. 2 is an enlarged sectional view of a portion of the head having the valve openings.

Fig. 3 is a sectional view on the plane of line 3—3 of Fig. 2.

1 indicates a body portion produced by lap welding the longitudinal seam of a sheet and 2 and 3 indicate heads welded to the body portion. The heads may be either straight, concave or convex as disclosed in the patent referred to; and preferably the metal is crimped to produce chime 4. 5 and 6 indicate two valves here shown seated in head 2 below the chime 4 and suitably covered by bonnet 7 preferably of the construction shown in application Ser. No. 401,731 filed Aug. 6, 1920.

Head 2 is provided with two valve seats, both alike, and one only need be described. Each opening or valve seat consists of a plurality of concentric portions of different diameters arranged in step formation with that portion having the smallest diameter innermost. These portions are indicated at 8, 9, 10 and 11. The wall of portion 8 is preferably smooth, that of 9 polygonal-shape and those of 10 and 11 are threaded. 12 indicates a pipe of a diameter slightly smaller than portion 8 and bent on such a long radius, as shown, that it may be introduced into or removed from the container through the opening aforesaid. Each pipe is provided adjacent its end with a head 13 having a polygonal-shape exterior fitting in portion 9 so that said pipe may be retained circumferentially in the position desired whereby the two pipes may occupy the divergent position indicated in Fig. 1. 14 is a hollow nut having a polygonal-shape interior wall 15 and with its exterior in engagement with portion 10. It will be understood that by bringing said nut home the head of the pipe is clamped against the ledge 16 thereby holding the parts firmly in position. The valve, such as 5, is provided with a threaded portion 17 in threaded engagement with portion 11. If it is desired to renew pipe 12, the valve and nut 14 are removed and the pipe withdrawn and another one substituted, and it will be understood that the places of leakage are reduced to the valve seats but that nevertheless the pipes are removable.

I claim:

1. The combination with a container having an opening therein, of a bent pipe capable of insertion through said opening, and apertured retaining means, registering with the pipe for so predetermining the circumferential position of said pipe in said opening that its bent portion will extend in a desired direction within the container with respect to the longitudinal axis of the latter.

2. The combination with a container having an opening therein, of a bent pipe capable of insertion through said opening, and an apertured head terminating the pipe and acting as a retaining means for so predetermining the circumferential position of said pipe in said opening that its bent portion will extend in a desired direction within the container with respect to the longitudinal axis of the latter.

3. The combination with a container having an opening therein a portion of which is of enlarged diameter and polygonal-shape in cross section, a pipe capable of insertion through said opening, a hollow head carried by said pipe of larger diameter than said pipe and having a polygonal-shaped exterior to fit in the polygonal-shape portion of the opening, and a hollow nut to clamp the pipe in position.

4. A container comprising a body portion, end heads secured thereto, a valve seat in one of said heads comprising a series of concentric openings of different diameters the innermost one being of the smallest diameter and the one adjacent thereto having polygonal-shape walls, a pipe capable of insertion or withdrawal through said openings, a hollow head on said pipe adjacent one end thereof having a polygonal shape exterior to fit the polygonal-shape opening, a hollow nut to clamp the head of the pipe in the valve opening, and a removable valve in the outermost opening.

5. The combination with a container comprising: a body portion and end heads, at least one of said heads having a plurality of openings near the central axis of the container, a plurality of bent pipes capable of insertion through said openings, and apertured retaining means, registering with the pipes for so predetermining the circumferential position of said pipes in said openings that the bent portions thereof will extend in divergent directions within the container.

6. The combination with a container comprising: a body portion and end heads, at least one of said heads having a plurality of openings near the central axis of the container, a plurality of bent pipes capable of insertion through said openings, and apertured heads terminating each pipe and acting as retaining means for so predetermining the circumferential position of said pipes in said openings that the bent portions thereof will extend in divergent directions within the container.

7. A container comprising: a body portion, end heads welded thereto, at least one of said heads having a plurality of valve openings near the central axis of the container, a removable valve seated in each opening, a plurality of pipes, one for each opening, so bent as to extend adjacent to the outer circumference of the container, and apertured retaining means for each pipe for so predetermining the circumferential position of said pipes in said openings that the bent portions thereof will extend in divergent directions within the container, whereby the pipes are capable of insertion into or withdrawal from divergent positions in said openings as well after as before the heads are welded to the body portion.

Signed at New York city, in the county of New York and State of New York this 25th day of January, 1922.

CHARLES L. ROWLAND.